(12) United States Patent
Hahn et al.

(10) Patent No.: US 12,099,750 B2
(45) Date of Patent: Sep. 24, 2024

(54) MANAGEMENT OF HOST FILE-SYSTEM DEFRAGMENTATION IN A DATA STORAGE DEVICE

(71) Applicant: Western Digital Technologies, Inc., San Jose, CA (US)

(72) Inventors: Judah Gamliel Hahn, Ofra (IL); Ramanathan Muthiah, Bangalore (IN); Bala Siva Kumar Narala, Kakinada (IN); Narendhiran Chinnaanangur Ravimohan, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/865,641

(22) Filed: Jul. 15, 2022

(65) Prior Publication Data

US 2024/0020060 A1    Jan. 18, 2024

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 12/0253* (2013.01); *G06F 3/0679* (2013.01)

(58) Field of Classification Search
None
See application file for complete search history.

(56) References Cited

U.S. PATENT DOCUMENTS

| 6,519,684 B1* | 2/2003 | Moyer | G06F 12/1027 711/134 |
| 8,166,276 B2* | 4/2012 | Serebrin | G06F 9/34 711/206 |

(Continued)

FOREIGN PATENT DOCUMENTS

WO     2016112957 A1    7/2016

OTHER PUBLICATIONS

NVM Express. NVM Command Set Specification. Jul. 23, 2021. 105 pages.

*Primary Examiner* — Elias Mamo
(74) *Attorney, Agent, or Firm* — Michael Best & Friedrich LLP

(57) ABSTRACT

A data storage device having a flash translation layer configured to handle file-system defragmentation in a manner that avoids, reduces, and/or optimizes physical data movement in flash memory. In an example embodiment, the memory controller maintains in a volatile memory thereof a lookaside table that supplants pertinent portions of the logical-to-physical table. Entries of the lookaside table are configured to track source and destination addresses of the host defragmentation requests and are logically linked to the corresponding entries of the logical-to-physical table such that end-to-end data protection including the use of logical-address tags to the user data can be supported by logical means and without physical data rearrangement in the flash memory. In some embodiments, physical data rearrangement corresponding to the file-system defragmentation is (Continued)

performed in the flash memory in response to certain trigger events, which can improve the input/output performance of the data-storage device.

20 Claims, 6 Drawing Sheets

(56) References Cited

U.S. PATENT DOCUMENTS

| | | | | |
|---|---|---|---|---|
| 8,688,432 | B2* | 4/2014 | Gheith | G06F 9/45537 |
| | | | | 703/23 |
| 10,719,463 | B1* | 7/2020 | Bshara | G06F 12/0891 |
| 10,725,807 | B2* | 7/2020 | Tsirkin | G06F 12/1009 |
| 11,262,928 | B2 | 3/2022 | Muthiah | |
| 11,620,233 | B1* | 4/2023 | Habusha | G06F 12/0891 |
| | | | | 711/207 |
| 2011/0107052 | A1* | 5/2011 | Narayanasamy | G06F 3/0608 |
| | | | | 711/170 |
| 2014/0223231 | A1 | 8/2014 | Mangold et al. | |
| 2020/0159670 | A1 | 5/2020 | Brandt et al. | |
| 2020/0202215 | A1 | 6/2020 | Sadowski | |
| 2020/0341908 | A1 | 10/2020 | Shin et al. | |
| 2021/0223979 | A1 | 7/2021 | Li et al. | |
| 2021/0389876 | A1 | 12/2021 | Muthiah | |
| 2022/0043747 | A1* | 2/2022 | Palmer | G06F 3/0604 |
| 2022/0091975 | A1 | 3/2022 | Muchherla et al. | |
| 2022/0147444 | A1 | 5/2022 | Xu et al. | |
| 2023/0236966 | A1 | 7/2023 | Yarimi et al. | |

* cited by examiner

200

400

600

MANAGEMENT OF HOST FILE-SYSTEM DEFRAGMENTATION IN A DATA STORAGE DEVICE

FIELD

This application relates generally to data storage devices, and more particularly but not exclusively, to file-system defragmentation.

BACKGROUND

This section introduces aspects that may help facilitate a better understanding of the disclosure. Accordingly, the statements of this section are to be read in this light and are not to be understood as admissions about what is in the prior art or what is not in the prior art.

In computing and data storage, fragmentation is the tendency of a file system to lay out the contents of files non-continuously and/or non-sequentially. File-system fragmentation can negatively impact data-access time and hinder data throughput. For example, in a hard disk drive, sequential data reads are fast, but seeking to different addresses is relatively slow. Since reading or writing a fragmented file typically requires numerous seeks, it is slower than reading or writing a contiguous file. Fragmentation can be remedied by reorganizing files and free space into contiguous areas, a process typically referred to as "defragmentation." Since solid state drives (SSDs) do not seek, defragmentation is typically not recommended for SSDs. However, fragmentation still occurs in SSDs, which may detrimentally affect the overall performance of the SSDs.

SUMMARY

Disclosed herein are various embodiments of a data storage device having a flash translation layer configured to handle file-system defragmentation in a manner that avoids, reduces, and/or optimizes physical data rearrangement in flash memory. In an example embodiment, the memory controller maintains, e.g., in a volatile memory thereof, a lookaside table that supplants pertinent portions of the logical-to-physical (L2P) table. Entries of the lookaside table are configured to track source and destination addresses of the host defragmentation requests and are logically linked to the corresponding entries of the logical-to-physical table such that end-to-end data protection including the use of logical-address tags to the user data can be supported by logical means and without physical rearrangement of user data in the flash memory. In some embodiments, physical data rearrangement corresponding to the file-system defragmentation can be performed in the flash memory only in response to selected trigger events, which can improve the input/output performance of the data-storage device.

According to an example embodiment, provided is a data storage device, comprising: a non-volatile memory to store data; a second memory to store an L2P table and a lookaside table; and a controller coupled to the non-volatile memory and the second memory and configured to: in response to a first host command having a source logical address and a destination logical address, update the lookaside table with a table entry having the source logical address and the destination logical address; logically link the table entry of the lookaside table and a corresponding entry of the L2P table; and access the table entry of the lookaside table and the corresponding entry of the L2P table to control a memory operation on the data in the non-volatile memory. In various examples, the second memory can be a volatile memory associated with the controller or a dedicated partition (e.g., a control block or portion) of the non-volatile memory.

According to another example embodiment, provided is a method performed by a data storage device that receives commands from a host device, the method comprising: updating, with a controller, a lookaside table with a table entry having a source logical address and a destination logical address specified in a first host command, the lookaside table being stored in a control-data memory; logically linking, with the controller, the table entry of the lookaside table and a corresponding entry of an L2P table stored in the volatile memory; and accessing, with the controller, the table entry of the lookaside table and the corresponding entry of the L2P table to control a memory operation on user data stored in a non-volatile memory. In various examples, the control-data memory can be a volatile memory associated with the controller or a dedicated partition (e.g., a control block or portion) of the non-volatile memory.

According to yet another example embodiment, provided is an apparatus that receives commands from a host device, the apparatus comprising: means for updating a lookaside table with a table entry having a source logical address and a destination logical address specified in a first host command, the lookaside table being stored in a control-data memory; means for logically linking the table entry of the lookaside table and a corresponding entry of an L2P table stored in the control-data memory; and means for accessing the table entry of the lookaside table and the corresponding entry of the L2P table to control a memory operation on data stored in a non-volatile memory.

Various aspects of the present disclosure provide for improvements in data storage devices. For example, optimizing the processes in which garbage collection and host device inputs/outputs are handled by data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

Figure 1:
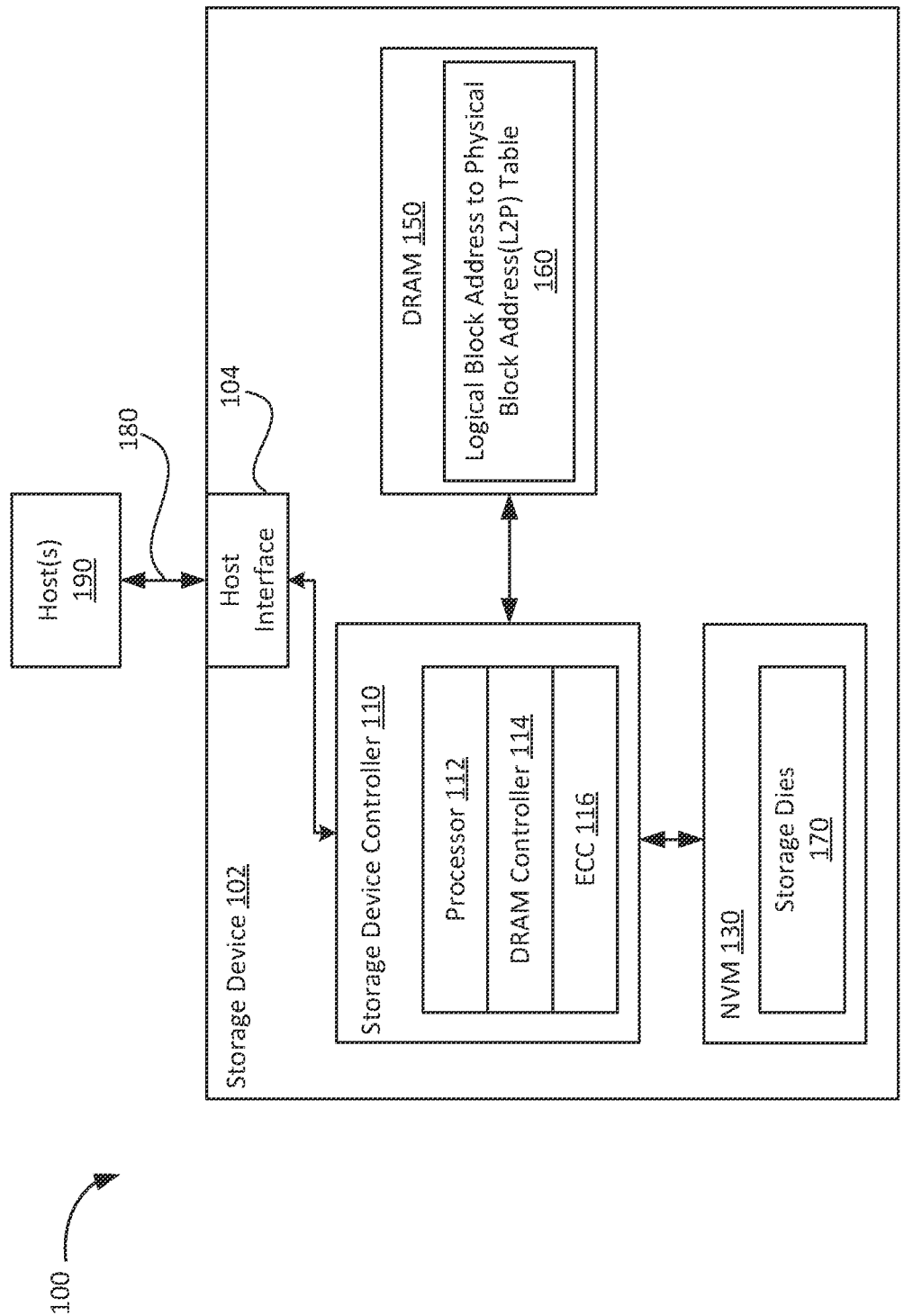
FIG. 1 is a block diagram illustrating a data-storage system in which example embodiments may be practiced.

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, etc.

NAND flash-based SSDs read and write data in units known as pages. In an example SSD, 128 pages constitute a single data block. Before any data can be written or programmed to the SSD, an entire block of data that are no longer needed or valid may have to be erased. An internal SSD housekeeping operation referred to as "garbage collection" or "GC" is used to manage and maintain the available storage space, handling the disparity between the erase unit size (block) and the read/write unit size (page). When a previously written block is targeted for garbage collection, the valid data pages are gathered up and moved to another block in the SSD so that the block containing the invalid data pages can be fully erased.

Every time a non-contiguous logical block address (LBA) range is addressed by the host, a new input/output (I/O) command is sent to the data storage device for each non-contiguous portion of the LBA range, which results in a corresponding processing overhead. Eventually, as the file system gets more and more fragmented, the cumulative processing overhead can become large enough to reduce the overall SSD performance. Herein, the relevant fragmentation is not the physical fragmentation, but rather the fragmentation of the file organization and/or structure in the file system. Accordingly, with SSDs, the operating system (host) can perform defragmentation to prevent the file system from reaching the system's maximum file-system fragmentation tolerance.

Depending on the particular operating system and/or file-system requirements, the criteria (e.g., one or more thresholds) for determining when to issue a file-system defragmentation command to the memory controller may vary. For hard disk drives, the physical fragmentation becomes detrimental much sooner than the file-system fragmentation. In contrast, for SSDs, the file-system fragmentation typically contributes more significantly to the performance degradation than the physical fragmentation. As a result, a different approach to defragmentation is needed for SSDs compared to defragmentation used for hard disk drives.

At least some of the above-indicated problems may be addressed using at least some embodiments of file-system defragmentation methods and apparatus disclosed herein. For example, in various embodiments, the adverse effects of file-system fragmentation are mitigated by one or more of the following: (i) updating the logical-to-physical (L2P) table to change association of physical addresses of sections of the user data from being associated with the source logical addresses to being associated with the destination logical addresses of the host defragmentation requests without moving the user data in the flash memory; (ii) maintaining a lookaside table that supplants pertinent portions of the L2P table for end-to-end data protection purposes; and (iii) performing physical data rearrangement corresponding to the file-system defragmentation only in response to certain trigger events.

Flash-based data storage devices (e.g., SSDs) use L2P tables to translate logical addresses of input/output (I/O) requests to corresponding flash-memory physical addresses. The layer that performs the translation is referred to as the flash translation layer (FTL). Controllers of some data storage devices may have a random-access memory (RAM) that can be used to store therein at least a portion of the L2P table.

FIG. 1 is a block diagram illustrating a data-storage system 100 in which example embodiments may be practiced. System 100 comprises a data storage device 102 connected to a host device 190 by way of a communication path 180. In an example embodiment, communication path 180 can be implemented using an electrical bus, a wireless connection, or any other suitable data link. Data storage device 102 can be a flash memory device, e.g., an SSD, a flash memory, or other suitable non-volatile memory (NVM).

In some embodiments, data storage device 102 may be embedded within host device 190. In some other embodiments, data storage device 102 may be removable from host device 190, e.g., may be removably coupled to host device 190 in accordance with a removable universal serial bus (USB) configuration. In some embodiments, data storage device 102 may be used as an embedded storage drive, e.g., a mobile embedded storage drive, an enterprise storage drive (ESD), a client storage device, a cloud storage drive, or other suitable data storage device.

As shown in FIG. 1, data storage device 102 comprises a host-device interface 104, an electronic controller 110, an NVM 130, and a volatile memory (e.g., a DRAM) 150. In operation, host-device interface 104 enables communications between data storage device 102 and host device(s) 190. Such communications may include, inter alia, transmission of data between NVM 130 and host device(s) 190. NVM 130 comprises storage dies 170, which may include any one type or any suitable combination of NAND flash devices, NOR flash devices, and other suitable non-volatile memory devices. Storage dies 170 may be organized into channels, each of the channels being based on a corresponding bus, e.g., an 8-bit bus, connecting the corresponding subset of storage dies 170 to controller 110. Individual ones of storage dies 170 may further be organized into a hierarchy of planes, blocks, and pages. NVM 130 and/or individual ones of the storage dies 170 thereof may also include support circuitry (not explicitly shown in FIG. 1), such as read and write circuitry. Such read/write circuitry may be implemented in a single component or may be divided into separate components, such as a read-circuitry component and a separate write-circuitry component. In an example embodiment, DRAM 150 is used, inter alia, to store an L2P table 160.

Controller 110 includes components, such as circuits, firmware, and software, that bridge NVM 130 to host-device interface 104, with only some of said components being explicitly shown in FIG. 1 for better clarity. For example, controller 110 may include: (i) an embedded processor 112; (ii) an electrically erasable firmware read-only memory (ROM, not explicitly shown in FIG. 1); (iii) a DRAM controller 114; (iv) an error-correction code (ECC) circuit or module 116; and (v) a flash component interface (not explicitly shown in FIG. 1). In some embodiments, controller 110 may also include DRAM 150 or other functionally similar volatile-memory having stored therein the L2P table 160.

Processor 112 is configured to support, e.g., some or all of the following operations: wear leveling, bad-block management, data scrambling, error-correction coding, garbage collection, trim, address mapping, file-system defragmentation, and other pertinent operations. DRAM controller 114 operates as an electronic controller of DRAM 150. ECC entity 116 may typically include two submodules, with a first of the submodules running a first ECC applied to data stored in NVM 130, and with a second of the submodules running a different second ECC applied to data stored in DRAM 150, including the data of L2P table 160 and other tables that may be stored therein (see, e.g., FIG. 5).

Host device 190 may address data stored in NVM 130 using a logical address. However, the data are stored in NVM 130 at physical addresses. The L2P table 160 is used to map from the logical address used by host device 190 to the physical address where the data are actually stored in NVM 130. When host device 190 requests to read data, controller 110 may look up the physical address in L2P table 160 to access the requested data. When host device 190 requests to write or update data in NVM 130, controller 110 may update L2P table 160 accordingly.

A master L2P table may be stored in NVM 130 but, to be efficiently used or updated by controller 110, at least a pertinent portion of the master L2P table is stored in DRAM 150, e.g., in L2P table 160. When L2P table 160 is updated, the updates need to be written back into the master L2P table stored in NVM 130. During the design process of data storage device 102, it may be stipulated whether DRAM 150 will be specified to hold a copy of the whole master L2P table for the entire logical address space. A decision not to hold the whole master L2P table in DRAM 150 may be due to, e.g., a constrained size of DRAM 150. Similar design decisions may also be made with respect to other tables that may be used instead of or in conjunction with L2P table 160 according to various embodiments.

For illustration purposes and without any implied limitations, some example embodiments may be described hereinbelow in reference to page-level L2P mapping. From the provided description, a person of ordinary skill in the pertinent art will readily understand how to make and use other embodiments, e.g., implementing block-level L2P mapping or other specific granularities of L2P mapping.

For an example embodiment of NVM 130, with page-level L2P mapping, a physical address may include a channel number, a die number, a block number, and a page number. For a 4-kB page size, a 32-TB NVM 130 may require approximately 32 GB of such L2P entries. With the added ECC overhead, this volume of L2P entries can be accommodated, e.g., by a 40-GB DRAM 150. This estimate of the DRAM capacity scales approximately linearly with the data capacity of NVM 130.

Although FIG. 1 shows controller 110 as being connected to and employing DRAM 150, alternative embodiments are also possible. For example, in one such embodiment, controller 110 may employ, for similar functions, a built-in cache memory, e.g., a static random-access memory (static RAM or SRAM) which is a part of the controller circuitry. In another embodiment, instead of DRAM 150, controller 110 may use a dedicated portion of NVM 130 as storage for L2P table 160.

Figure 2:
FIG. 2 is a flowchart illustrating a file-system defragmentation method according to an embodiment.

FIG. 2 is a flowchart illustrating a file-system defragmentation method 200 according to an embodiment. For illustration purposes and without any implied limitations, method 200 is described below as being triggered by a defragmentation command received by controller 110 from host device 190. However, in some embodiments, method 200 may be triggered by other single commands or by sets of two or more commands. For example, in one possible embodiment, method 200 may be triggered by a copy command received by controller 110 from host device 190.

Method 200 includes the controller 110 receiving a defragmentation command from host device 190 (at block 202). As already indicated above, host device 190 may issue such a defragmentation command, e.g., to prevent the file system from reaching the host's maximum file-system fragmentation tolerance or for another purpose related to file-system management. For example, the defragmentation command may specify, for a section of user data, a source range of logical addresses and a different destination range of logical addresses. A conventional response to such a command may typically involve physical data movement, e.g., from the physical addresses corresponding to the source range of logical addresses to the physical addresses corresponding to the destination range of logical addresses. In contrast, a response of data storage device 102 to such a command in accordance with method 200 does not typically involve any physical data movement in NVM 130, e.g., as further detailed below.

Method 200 includes the controller 110 accessing source and destination portions of L2P table 160 (at block 204). The source portion of L2P table 160 has mappings of the source range of logical addresses specified in the defragmentation command received at block 202. The destination portion of L2P table 160 has mappings of the destination range of logical addresses specified in the defragmentation command received at block 202. In some cases, e.g., when the section of data does not occupy a contiguous range of logical addresses, controller 110 may access the corresponding multiple source and destination portions of L2P table 160 (at block 204).

Method 200 includes the controller 110 updating the destination portion(s) of L2P table 160 (at block 206). The update is performed based on the defragmentation command of block 202. In an example embodiment, the update of L2P table 160 (at block 206) includes updating (e.g., replacing) the physical addresses associated with the destination range of logical addresses to specify therein the physical addresses corresponding to the source range of logical addresses.

Method 200 includes the controller 110 updating the source portion(s) of L2P table 160 (at block 208). The update is performed based on the defragmentation command of block 202. In an example embodiment, the update of L2P table 160 (at block 208) includes invalidating the L2P mapping(s) of the source range of logical addresses. Such invalidation may be similar to the invalidation performed for an "erase" operation.

Method 200 includes the controller 110 flushing the updated L2P portions (at block 210). In an example embodiment, the flushing operation includes syncing the corresponding portions of the master L2P table stored in NVM 130 with the updated portions of L2P table 160 stored in DRAM 160. In various examples, upon completion of the syncing operation, controller 110 may or may not send back to host device 190 an acknowledgement of the completed execution of the defragmentation command.

Method 200 includes the controller 110 receiving a second command from host device 190 (at block 212). For example, the second host command can be a read command corresponding to the destination range of logical addresses of the defragmentation command of block 202. In some cases, the second host command can be a different (from read) host command corresponding or referring to the destination range of logical addresses of the defragmentation command of block 202.

Method 200 includes the controller 110 accessing L2P table 160 in response to the second host command (at block 214). More specifically, controller 110 may operate to access (at block 214) the entry of L2P table 160 corresponding to the range of logical addresses of the second host command received at block 212. Method 200 further includes the controller 110 fetching the physical address specified by the accessed entry of L2P table 160 (at block 214). Note that the physical address fetched at block 214 will be the physical address resulting from the update performed at block 206. Method 200 further includes the controller 110 routing the second host command to the fetched physical address in NVM 130 (at block 214).

In some embodiments, data-storage system 100 may support end-to-end data protection (E2EDP). E2EDP is a feature that extends error control to cover the entire data path from host device 190 to NVM 130 and back and ensures data integrity at multiple points along the data path. In various embodiments, E2EDP can identify an error occurring at various transfer points along the data path using one or more of the following: L2P parity protection, host-LBA embedding and read page check, and various ECC techniques, such as cyclic redundancy checksum (CRC), Bose-Chaudhuri-Hocquenghem (BCH) coding, and low-density parity-check (LDPC) coding.

Figure 3A:
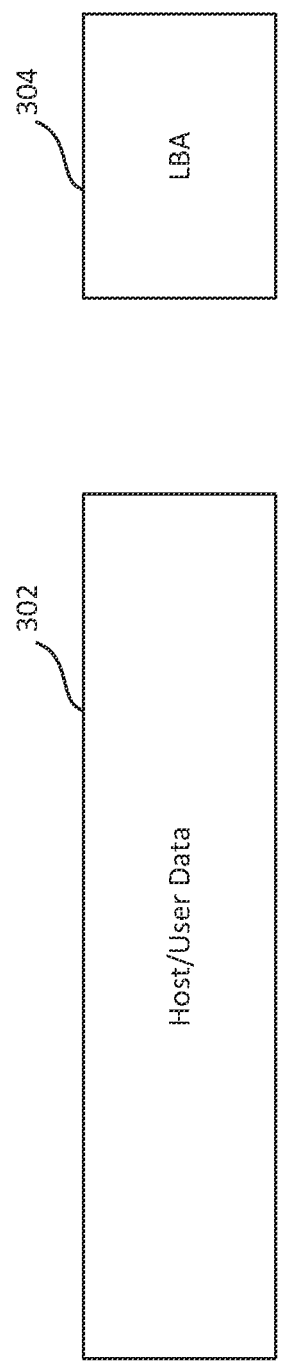
FIGS. 3A-3B are block diagrams illustrating an example feature of end-to-end data protection that can be used in the data-storage system of FIG. 1 according to an embodiment.
Figure 3B:
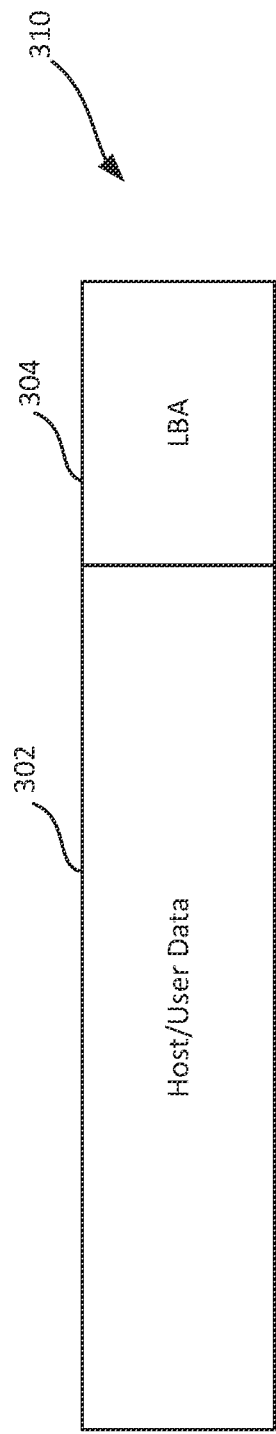

FIGS. 3A-3B are block diagrams illustrating the host-LBA embedding that can be used for E2EDP in data-storage system 100 according to an embodiment. In this embodiment, when host device 190 writes data to data storage device 102, two separate elements pictorially shown in FIG. 3A are provided thereto: (i) host/user data 302 to be written and (ii) an LBA 304 associated with the data. Data storage device 102 operates to attach the host LBA 304, as a tag, along with the data 302, e.g., by logically joining the two elements into a tagged data section 310, as pictorially shown in FIG. 3B. Tagged data section 310 is written to a physical address in NVM 130. The host LBA 304 and the physical address are then logged into L2P table 160.

When a read command is issued by host device 190 for the host LBA 304, controller 110 looks to L2P table 160 to determine which physical addresses contain the corresponding data 302. When NVM 130 is accessed at that physical address, the whole tagged data section 310 is read, thereby providing the LBA value of the tag 304. The latter LBA value is then compared with the LBA value in L2P table 160 to ensure a match. This process for storing the LBA when data is written, and then reading the stored LBA back and comparing it to the entry stored in L2P table 160, ensures, as part of the E2EDP feature, that data storage device 102 returns the correct data 302 when requested.

Since the processing implemented at blocks 206, 208 of method 200 can modify the contents of L2P table 160 without physically moving the data, at least some embodiments of method 200 may be incompatible with some implementations of the E2EDP feature.

Nevertheless, method 200 may beneficially be used, e.g., for various SD/USB cards, for which E2EDP is not a requirement.

An SD card, short for Secure Digital card, is a type of removable memory card used to read and write data in a variety of mobile electronics, cameras, video game consoles, set-top boxes, smart appliances, and many other devices. For example, the Secure Digital High Capacity (SDHC) card supports capacities up to 32 GB and uses the FAT32 file system. The Secure Digital eXtended Capacity (SDXC) format can store up to 2 TB on the exFAT file system. The Secure Digital Ultra Capacity (SDUC) card can store up to 128 TB per card using the exFAT file system. At least some of the available form-factor options include the SD, miniSD, microSD, SDHC, miniSDHC, microSDHC, SDXC, and microSDXC form factors.

USB cards or drives are removable data storage devices equipped with a USB connector. USB drives are typically compatible with any system that offers a USB port, including Windows, Mac, and Linux computers. There is a wide range of data capacities available for USB drives, e.g., up to the 1 TB capacity. A USB type A or type C port connector may be used. Various USB drives may be compatible with the USB2, USB3, or USB4 specification.

Figure 4:
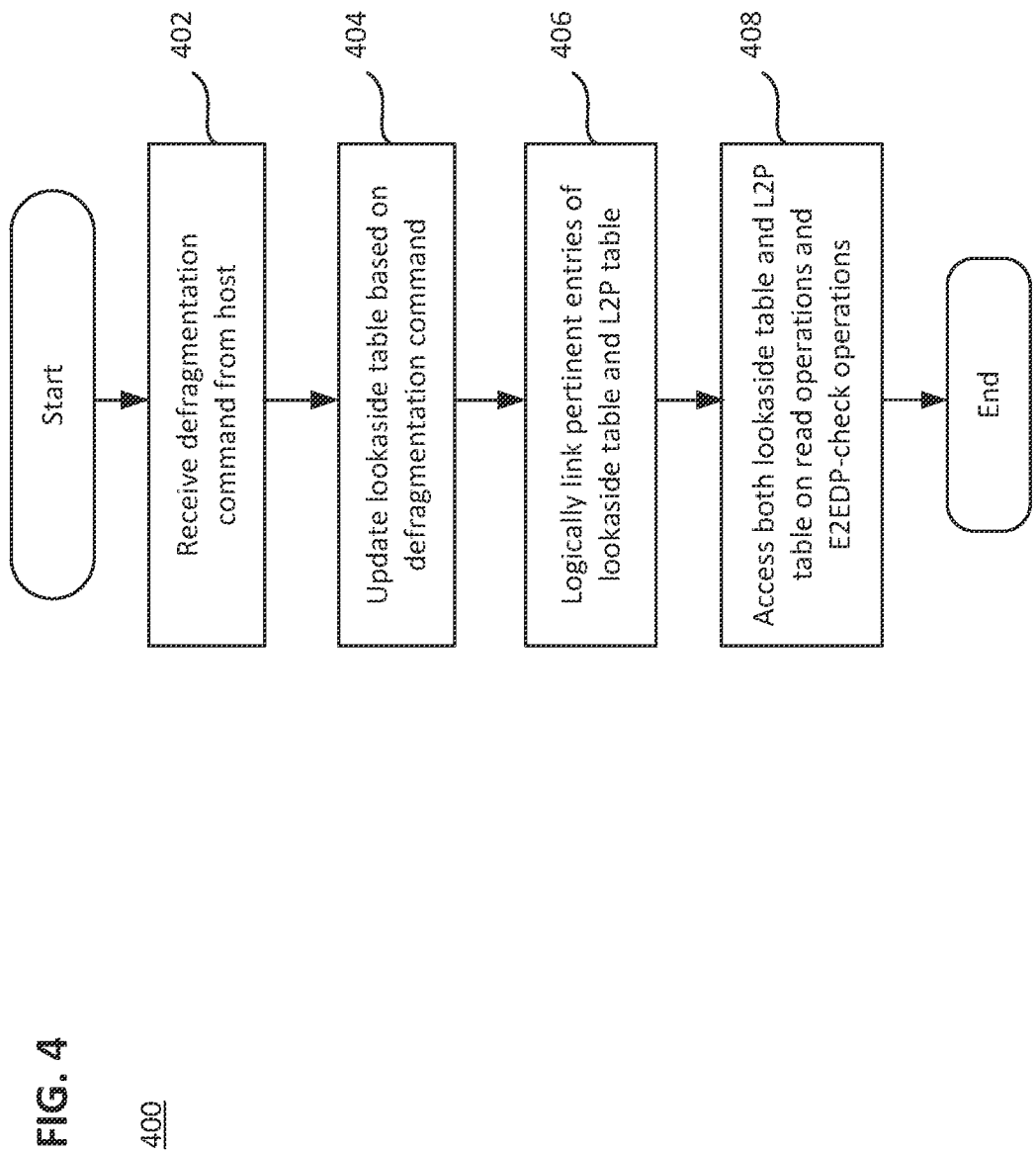
FIG. 4 is a flowchart illustrating a file-system defragmentation method according to another embodiment.

FIG. 4 is a flowchart illustrating a file-system defragmentation method 400 according to another embodiment. One possible embodiment of method 400 may be viewed as being a modification of method 200. Another possible embodiment of method 400 may be a stand-alone solution different and distinct from method 200. One or more features of method 400 beneficially make this method compatible with the E2EDP feature in general and the above-described LBA tagging in particular.

For illustration purposes and without any implied limitations, method 400 is described below as being triggered by a defragmentation command received by controller 110 from host device 190. However, in some embodiments, method 400 may be triggered by other single commands or by sets of two or more commands. For example, in one possible embodiment, method 400 may be triggered by a copy command received by controller 110 from host device 190.

Method 400 includes the controller 110 receiving a defragmentation command from host device 190 (at block 402). The defragmentation command may specify, for a section of data, a source range of logical addresses and a different destination range of logical addresses. Similar to the corresponding feature of method 200, a response of data storage device 102 to the defragmentation command in accordance with method 400 substantially does not involve any physical data rearrangement in NVM 130.

Method 400 includes the controller 110 updating a lookaside table (at block 404). In an example embodiment, the lookaside table can be stored in DRAM 160 alongside L2P table 160. The update of the lookaside table is performed based on the defragmentation command of block 402.

Figure 5:
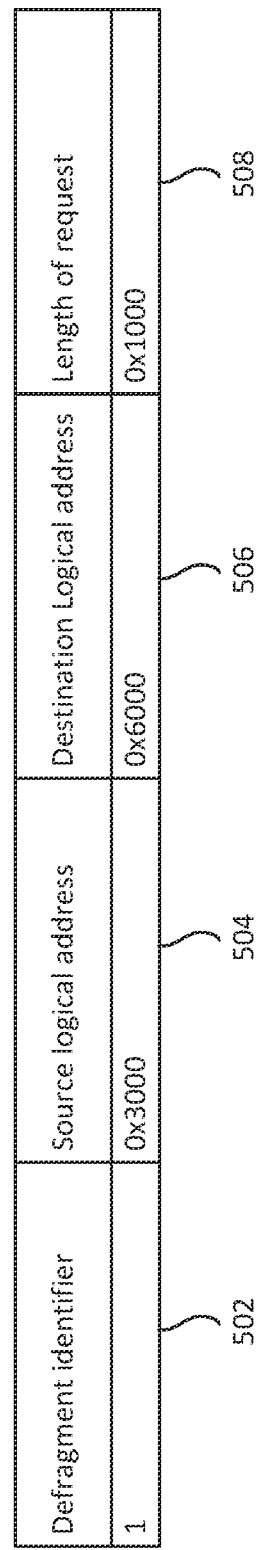
FIG. 5 illustrates a lookaside table that can be used in the file-system defragmentation method of FIG. 4 according to an embodiment.

FIG. 5 is a diagram illustrating a lookaside table 500 that can be used in method 400 according to an embodiment. For illustration purposes and without any implied limitations, lookaside table 500 is shown and described as having one entry. However, in many cases, lookaside table 500 may typically include more than one entry, with each of the entries being analogous to the one entry illustrated in FIG. 5.

As indicated in FIG. 5, each entry of lookaside table 500 includes four fields, an identifier field 502, a source logical address field 504, a destination logical address field 506, and a length field 508. Identifier (ID) field 502 has an index value that can be used to identify different entries of table 500. For example, different entries of table 500 may be indexed consecutively in the order of their creation based on different defragmentation commands received at different instances of block 402 of method 400. Other fields (i.e., 504, 506, 508) of the corresponding entry of table 500 are populated based on the parameters of the corresponding defragmentation command.

For example, source logical address field 504 of the entry has the source logical addresses of the data section in question, as specified in the corresponding defragmentation command. Destination logical address field 506 of the entry has the destination logical addresses of the data section, as specified in the corresponding defragmentation command. Length field 508 of the entry has the length of the data section, as specified in the corresponding defragmentation command. As shown in FIG. 1, the fields 504, 506, 508 of the entry corresponding to ID=1 (in the field 502) have example values therein for illustration purposes. These example values may correspond to a copy or defragmentation request for 0x1000 pages with the source LBA 0x3000 and the destination LBA 0x6000.

Referring back to FIG. 4, method 400 includes the controller 110 logically linking the corresponding entries of lookaside table 500 and L2P table 160 (at block 406). In an example embodiment, such logical linking may include (i) identifying the entries having the same source LBA in lookaside table 500 and L2P table 160 and (ii) placing a corresponding pointer in the identified entry of lookaside table 500 pointing to the corresponding identified entry of L2P-table 160. Such logical linking may additionally or alternatively include configuring controller 110 to treat the entries of lookaside table 500 as superseding the linked entries of L2P-table 160.

Method 400 includes the controller 110 accessing (at block 408) both lookaside table 500 and L2P-table 160 for pertinent memory operations, e.g., on read operations and E2EDP-check operations. For example, upon receiving a read request from host device 190 for a particular LBA, controller 110 operates to access lookaside table 500 before accessing L2P-table 160. While accessing lookaside table 500 (at block 408), controller 110 operates to determine whether the particular LBA is present among the values stored in the destination logical address fields 506 of the lookaside table. Controller 110 performs further actions (at block 408), e.g., as described below. The specific further actions taken by controller 110 at block 408 typically depend on the result of the above determination.

At block 408, when the particular LBA is found in the fields 506 of lookaside table 500, controller 110 operates to fetch the physical address from the linked entry of L2P-table 160. Controller 110 further operates to route the read operation to the fetched physical address (at block 408). Upon retrieving the corresponding tagged data section 310 from that physical address, controller 110 operates to perform an E2EDP-check by comparing the LBA value of the tag 304 from the retrieved data section 310 with the LBA value of the corresponding field 504 of lookaside table 500 (at block 408). Alternatively, controller 110 may operate to perform the same E2EDP-check by comparing the LBA value of the tag 304 with the LBA value from the corresponding entry of L2P-table 160.

At block 408, when the particular LBA is not found in the fields 506 of lookaside table 500, controller 110 operates to search for and find that LBA in L2P-table 160. Controller 110 further operates to fetch the physical address associated with that LBA in L2P-table 160 (at block 408). Controller 110 then operates to route the read operation to the fetched physical address (at block 408). Upon retrieving the corresponding tagged data section 310 from that physical address, controller 110 operates to perform an E2EDP-check by comparing the LBA value of the tag 304 with the LBA value from the used entry of L2P-table 160 (at block 408).

In some alternative embodiments of method 400, L2P-table 160 may be accessed first (at block 408). In such embodiments, depending on the result of the E2EDP check, lookaside table 500 may or may not be accessed at block 408. More specifically, lookaside table 500 is not accessed when E2EDP check is successful. However, lookaside table 500 is accessed when E2EDP check fails.

Figure 6:
FIG. 6 is a flowchart illustrating a file-system defragmentation method according to yet another embodiment.

FIG. 6 is a flowchart illustrating a file-system defragmentation method 600 according to yet another embodiment. Method 600 differs from methods 200 and 400 in that method 600 involves physical movement or rearrangement of data in NVM 130 as described in more detail below. Similar to method 400, method 600 has one or more features compatible with the E2EDP and LBA tagging. For illustration purposes and without any implied limitations, method 600 is described below as being triggered by a defragmentation command received by controller 110 from host device 190. However, in some embodiments, method 600 may be triggered by other single commands or by sets of two or more commands. For example, in one possible embodiment, method 600 may be triggered by a copy command received by controller 110 from host device 190.

Method 600 includes the controller 110 receiving a defragmentation command from host device 190 (at block 602). The defragmentation command may specify, for a section of data, a source range of logical addresses and a different destination range of logical addresses. In some embodiments, block 602 may be implemented similar to block 402 of method 400.

Method 600 includes the controller 110 updating a corresponding lookaside table (at block 604). In an example embodiment, the lookaside table can be stored in DRAM 160 alongside L2P table 160. The update of the lookaside table is performed based on the defragmentation command of block 602. In at least some embodiments, block 604 may be implemented similar to block 404 of method 400. The lookaside table used in method 600 may be similar to lookaside table 500 (FIG. 5).

Method 600 includes the controller 110 logically linking the corresponding entries of lookaside table 500 and L2P table 160 (at block 606). In an example embodiment, such logical linking may include (i) identifying the entries having the same source LBA in lookaside table 500 and L2P table 160 and (ii) placing a corresponding pointer in the identified entry of lookaside table 500 pointing to the corresponding identified entry of L2P-table 160. Such logical linking may additionally or alternatively include configuring controller 110 to treat the entries of lookaside table 500 as superseding the linked entries of L2P-table 160.

Method 600 includes the controller 110 detecting a trigger event for physical movement or rearrangement of data in NVM 130 (at block 608). In some cases, the trigger event can be the controller 110 receiving a read command from host device 190, with the LBA specified in the received read command being one of the LBA values in the destination logical address fields 506 of lookaside table 500. In some other cases, the trigger event can be the controller 110 receiving a write command from host device 190, with the LBA specified in the received write command being one of the LBA values in the source logical address fields 504 of lookaside table 500. In yet some other cases, the trigger event can be a commencement of a GC operation implicating an entry of lookaside table 500. In yet some other cases, the trigger event can be the controller 110 receiving a write command for any LBA, e.g., for the source LBA, the destination LBA, or any other LBA for which the controller needs to assume that host device 190 has overwritten the data previously written thereat.

Method 600 includes the controller 110 causing NVM 130 to physically move (e.g., copy) the data associated with the logical address implicated by the trigger event to a different physical address (at block 610). For example, when the trigger event of block 608 is a read command, controller 110 issues a control command to NVM 130 causing the data associated with the corresponding destination logical address field 506 of lookaside table 500 to be copied to a different physical address (at block 610). Controller 110 also issues a synchronous read command for the same data (at block 610). When the trigger event of block 608 is a write command, controller 110 issues a control command to NVM 130 causing the data associated with the source logical address field 504 of lookaside table 500 to be copied to a different physical address (at block 610). Controller 110 also executes the write command for the incoming data (at block 610). When the trigger event of block 608 is a commencement of a GC operation, controller 110 issues a control command to NVM 130 causing the valid data in the physical data block that is going to be erased to be copied to a different physical address (at block 610).

Method 600 includes the controller 110 updating lookaside table 500 and L2P-table 160 (at block 612). For example, the entry of lookaside table 500 for which the corresponding data have been copied to the different physical address at block 610 may be deleted at block 612. L2P-table 160 is updated at block 612 with an entry properly listing the logical address and the physical address of the data that have been copied at block 610.

Various embodiments of method 600 may be beneficial because only the relevant data, i.e., the data implicated by the trigger event of block 608, are physically copied while other data are managed logically by way of lookaside table 500. Another benefit of method 600 is that, when any invalidation of an LBA happens prior to the corresponding read operation, the corresponding updates of table 500 and/or L2P-table 160 can be performed without any I/O transfers for NVM 130. At least these features of method 600 are beneficially capable of improving the I/O performance of data-storage system 100.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Unless explicitly stated otherwise, each numerical value and range should be interpreted as being approximate as if the word "about" or "approximately" preceded the value or range.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

"SUMMARY" in this specification is intended to introduce some example embodiments, with additional embodiments being described in "DETAILED DESCRIPTION" and/or in reference to one or more drawings. "SUMMARY" is not intended to identify essential elements or features of the claimed subject matter, nor is it intended to limit the scope of the claimed subject matter.

"ABSTRACT" is provided to allow the reader to quickly ascertain the nature of the technical disclosure. It is submitted with the understanding that it will not be used to interpret or limit the scope or meaning of the claims. In addition, in the foregoing "DETAILED DESCRIPTION," it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into "DETAILED DESCRIPTION," with each claim standing on its own as a separately claimed subject matter.

What is claimed is:

1. A data storage device, comprising:
   a non-volatile memory to store data;
   a second memory to store a logical-to-physical (L2P) table and a lookaside table; and
   a controller coupled to the non-volatile memory and the second memory and configured to:
      in response to a defragmentation host command having a source logical address and a destination logical address, update the lookaside table with a table entry having the source logical address in a source logical address field and the destination logical address in a destination logical address field;
      logically link the table entry of the lookaside table and a corresponding entry of the L2P table;
      access the lookaside table and the L2P table to control a memory operation on the data in the non-volatile memory, the memory operation being for a corresponding logical address; and
      determine whether the corresponding logical address is in the destination logical address field of the table entry.

2. The data storage device of claim 1, wherein the memory operation is performed in response to a second host command, the second host command being a read command for the destination logical address.

3. The data storage device of claim 1, wherein the memory operation is performed in response to a second host command, the second host command being a write command for the source logical address.

4. The data storage device of claim 1, wherein the memory operation is garbage collection in the non-volatile memory.

5. The data storage device of claim 1,
   wherein the data storage device is configured for end-to-end data protection using at least logical-address tags to the data; and
   wherein the non-volatile memory has stored therein a section of the data tagged with the source logical address.

6. The data storage device of claim 2, wherein, in response to the read command for the destination logical address, the controller is configured to:
   fetch a physical address from the corresponding entry of the L2P table; and
   route the host read operation to the physical address.

7. A method performed by a data storage device that receives commands from a host device, the method comprising:
   updating, with a controller, a lookaside table with a table entry having a source logical address in a source logical address field and a destination logical address in a destination logical address field in response to a defragmentation host command having the source logical address and the destination logical address, the lookaside table being stored in a control-data memory of the data storage device;
   logically linking, with the controller, the table entry of the lookaside table and a corresponding entry of a logical-to-physical (L2P) table stored in the control-data memory;

accessing, with the controller, the lookaside table and the L2P table to control a memory operation on data stored in a non-volatile memory of the data storage device, the memory operation being for a corresponding logical address; and determining, with the controller, whether the corresponding logical address is in the destination logical address field of the table entry.

8. The method of claim 7, wherein the memory operation is performed in response to a second host command, the second host command being a read command for the destination logical address or a write command for the source logical address.

9. The method of claim 7, wherein the memory operation is garbage collection in the non-volatile memory.

10. The method of claim 7,
wherein the data storage device is configured for end-to-end data protection using at least logical-address tags to the data; and
wherein the non-volatile memory has stored therein a section of the data tagged with the source logical address.

11. The method of claim 8, further comprising:
in response to the read command for the destination logical address,
fetching, with the controller, a physical address from the corresponding entry of the L2P table; and
routing, with the controller, the host read operation to the physical address.

12. The method of claim 7, further comprising:
in response to a trigger event, causing, with the controller, the non-volatile memory to generate, at a different physical address in the non-volatile memory, a copy of a section of the data located in the non-volatile memory at a physical address associated in the L2P table with the source logical address.

13. The method of claim 7, further comprising:
when the corresponding logical address is found in the destination logical address field, fetching, with the controller, a physical address from the corresponding entry of the L2P table; and routing, with the controller, the memory operation to the physical address.

14. The method of claim 7, further comprising:
when the corresponding logical address is not found in destination logical address fields of the lookaside table, searching, with the controller, for the corresponding logical address in the L2P table;
fetching, with the controller, a physical address from an entry of the L2P table associated with the corresponding logical address; and
routing, with the controller, the memory operation to the physical address.

15. The method of claim 7, further comprising configuring the controller to treat entries of the lookaside table as superseding the logically linked corresponding entries of the L2P-table.

16. The data storage device of claim 1, wherein, in response to a trigger event, the controller is further configured to cause the non-volatile memory to generate, at a different physical address in the non-volatile memory, a copy of a section of the data located in the non-volatile memory at a physical address associated in the L2P table with the source logical address.

17. The data storage device of claim 16, wherein the controller is further configured to update the L2P table to have an entry therein corresponding to the copy.

18. The data storage device of claim 16, wherein the controller is further configured to delete the table entry in the lookaside table.

19. The data storage device of claim 16, wherein the trigger event is later in time than the first defragmentation host command.

20. The method of claim 12, further comprising: updating, with the controller, the L2P table to have an entry therein corresponding to the copy; and deleting, with the controller, the table entry in the lookaside table; and wherein the trigger event is later in time than the first defragmentation host command.

* * * * *